A. MILLER & C. WORLEY.

FINISHING TOBACCO PLUGS.

No. 8060

Reissued Jan. 29, 1878

ATTEST:

Robert Burns
LeBlond Burdett

INVENTORS:

Anton Miller
Christian Worley
per Knight Bros
attys.

THE GRAPHIC CO. N.Y.

UNITED STATES PATENT OFFICE.

ANTON MILLER AND CHRISTIAN WORLEY, OF ST. LOUIS, MISSOURI, ASSIGNORS OF ONE-HALF THEIR RIGHT TO JOHN FINZER & BROTHERS, OF LOUISVILLE, KENTUCKY.

IMPROVEMENT IN FINISHING TOBACCO-PLUGS.

Specification forming part of Letters Patent No. 185,119, dated December 5, 1876; Reissue No. 8,060, dated January 29, 1878. Application filed December 29, 1877.

*To all whom it may concern:*

Be it known that we, ANTON MILLER and CHRISTIAN WORLEY, both of the city of St. Louis and State of Missouri, have invented a new and useful Improvement in Plug-Tobacco; and we do hereby declare that the following is a full, clear, and exact description of the same.

Our improvement consists in pressing into the side of the plug during the process of manufacture letters or marks, so as to be ineffaceable.

The main object is to enable consumers to identify in the plug the tobacco of any manufacturer after it leaves the hands of the latter.

Figure 1:
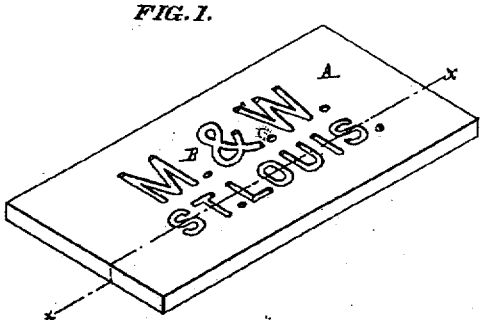
Figure 2:
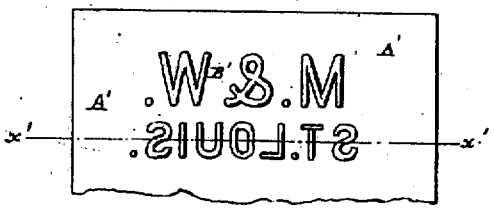
Figure 3:
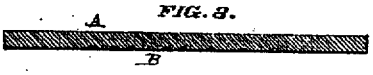
Figure 4:
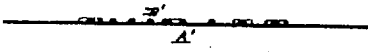

In the drawings, Figure 1 is a perspective view of the plug of tobacco, showing the impression of the letters in the side thereof. Fig. 2 is a face view of part of a compress-plate, showing the letters in relief. Fig. 3 is a section through the plug at *x x*, Fig. 1, with the impression at the bottom. Fig. 4 is a section of the compress-plate at *x′ x′*, Fig. 2.

A is a plug of tobacco, and at B are shown letters impressed in the side of the same. A′ is the compress-plate, having at B′ letters in relief, by which the impression at B is formed.

In carrying out our process the plugs are packed with alternating plates in the finisher, so that they take their permanent set with the impression in them, whereby said impression is preserved ineffaceable.

We have used the process of finishing tobacco, as described in Patent No. 181,512, issued to Worley and McCabe on the application of Christian Worley, and dated August 22, 1876; but this system of marking may be used in conjunction with the ordinary finishing process by having the devices in relief on pressure-plates used in the last pressing.

Our preferred manner of forming the letters on the plates A′ is by stamping them therein, and then making the letters solid by filling in the concave side of the letters with melted metal, such as solder, so that said letters will withstand the extreme pressure to which they are subjected in the finishing-box.

In constructing said compress-plate, however, any projecting surfaces in relief, either formed upon the plate or loose from the same, would secure the same result, and may be employed.

We do not of course confine ourselves to any particular words or letters, as the method may be used in the application of any distinguishing mark.

Having thus described our invention, what we claim as new is—

1. The described process of marking plug-tobacco, which consists in impressing letters or other marks directly into the side of the plug during the process of manufacture, and by the pressure employed in making the plug, substantially as described.

2. A tobacco-plug marked with an impression, substantially as described.

ANTON MILLER.
CHRISTIAN WORLEY.

Witnesses:
JOHN F. RYAN,
FRED. C. MEHL.